Jan. 31, 1939.  J. TJAARDA  2,145,671
SHOCK ABSORBER
Original Filed May 28, 1936   2 Sheets-Sheet 2
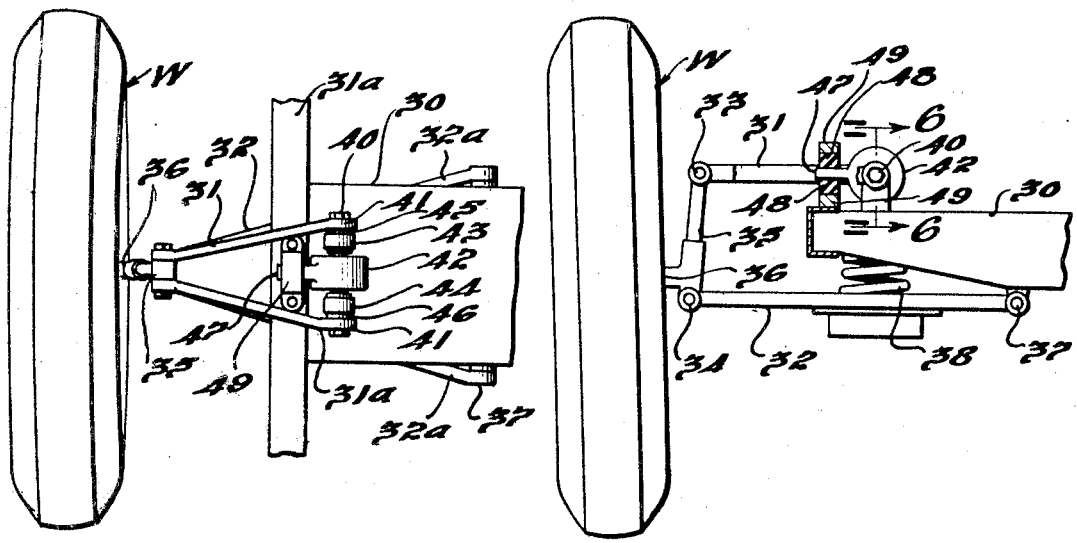
FIG. 4.
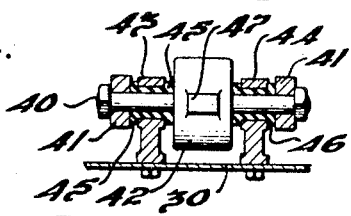
FIG. 5.
FIG. 7.   FIG. 6.
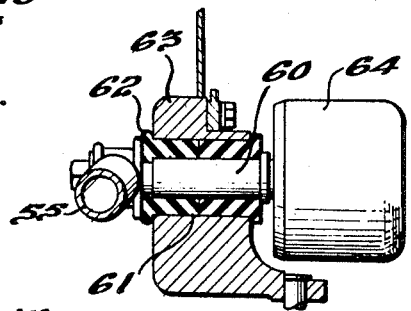
FIG. 8.
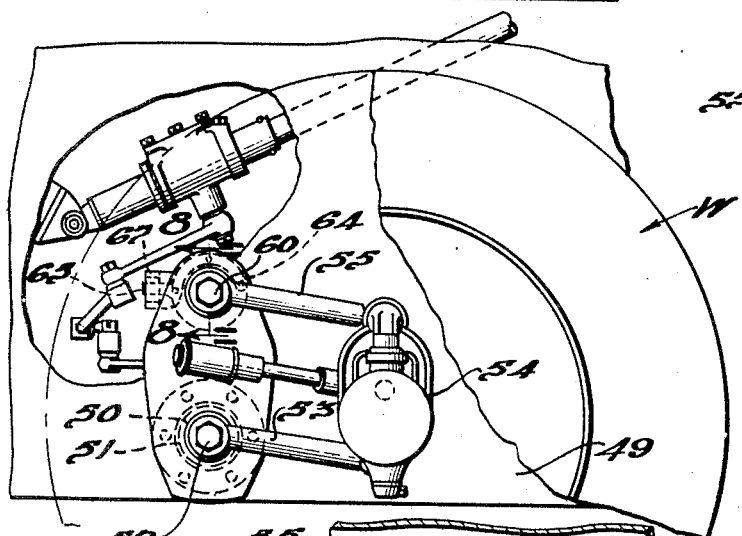
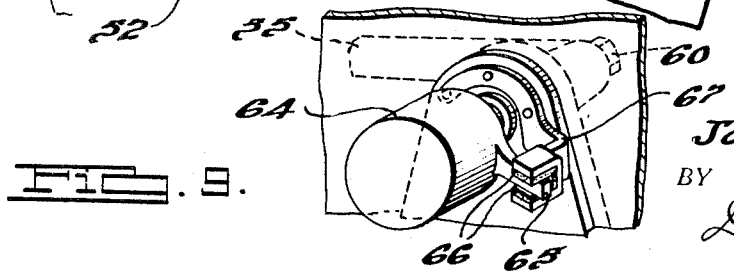
FIG. 9.
INVENTOR.
John Tjaarda.
BY
Dike, Calvert & Gray
ATTORNEYS.

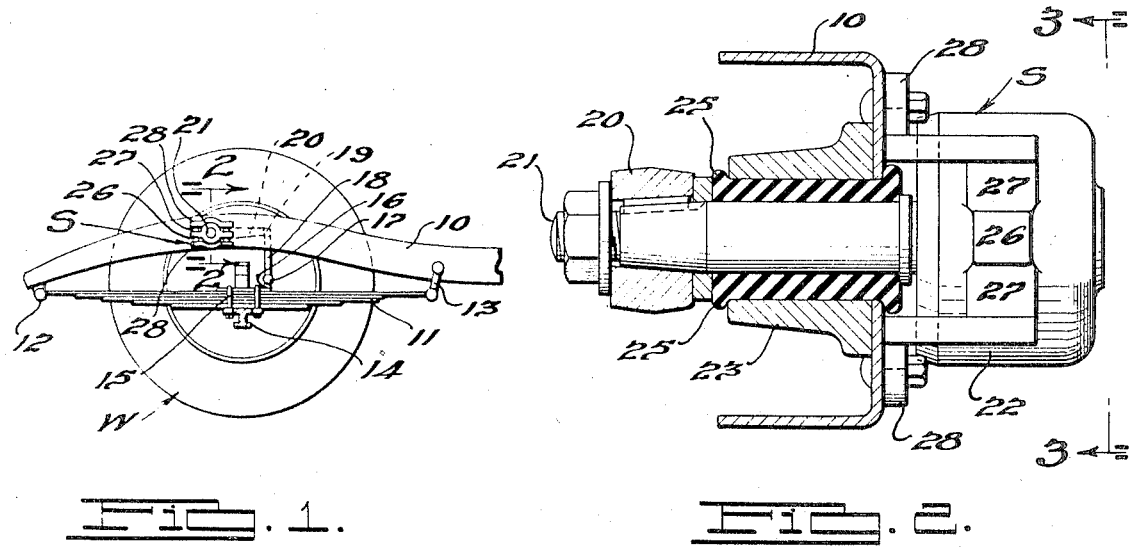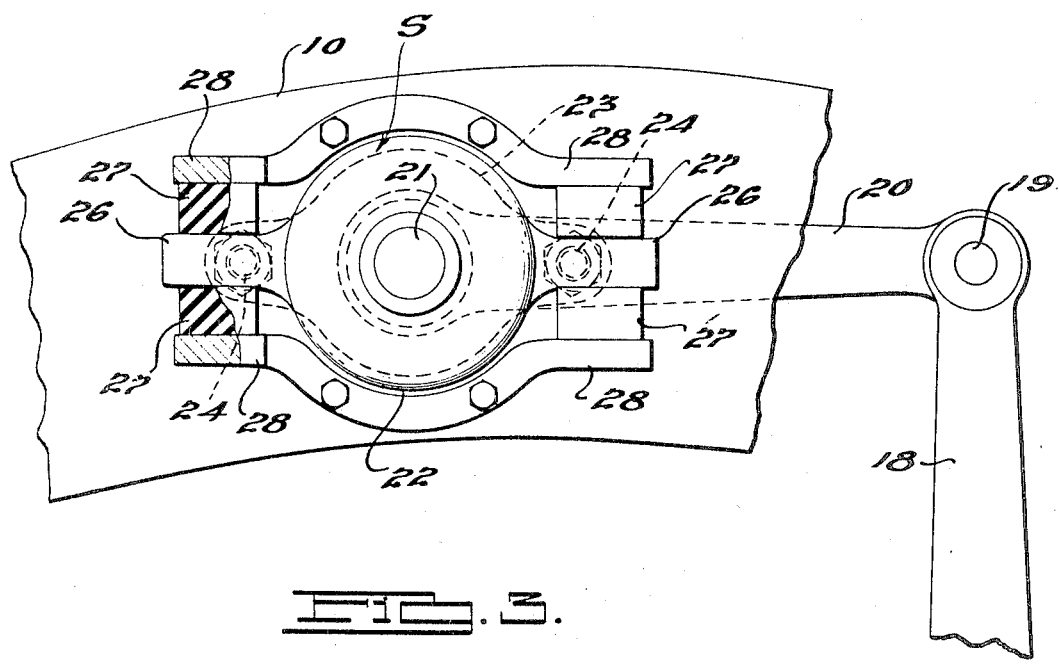

Patented Jan. 31, 1939

2,145,671

UNITED STATES PATENT OFFICE 2,145,671

SHOCK ABSORBER

John Tjaarda, Birmingham, Mich., assignor to Briggs Manufacturing Company, Detroit, Mich., a corporation of Michigan Application May 28, 1936, Serial No. 82,348
Renewed July 18, 1938

15 Claims. (Cl. 267—20)

This invention relates to shock absorbers, and more particularly to such shock absorbers as are adapted for use in automotive vehicles having resiliently mounted wheels. This application is a continuation in part of my co-pending application Serial No. 72,722, filed April 4, 1936.

It is commonly known that the wheels of land vehicles are subjected in operation to shocks of different frequencies and magnitudes, ranging from high frequency vibrations of the wheels produced when the vehicle is travelling at high speeds along smooth roads to very violent shocks of low frequency occurring when the vehicle is slowly travelling, for example, over poor rutted roads. It is also commonly appreciated that for satisfactory riding characteristics it is necessary to have the shocks of every type absorbed by the resilient mounting means of the wheels and to prevent their transmission to the body of the vehicle.

In vehicles without shock absorbers the small movements are absorbed by the spring with substantially no effect on the body of the vehicle, but if the vehicle is provided with shock absorbers having enough damping effect to satisfactorily cushion the compression and check the rebound accompanying large vertical movements of the wheels, the shock absorbers will be stiff enough to prevent the spring from absorbing such small movements and they will operate to transmit such movement to the body of the vehicle. Decreasing the stiffness of a shock absorber to a degree where it becomes capable of permitting the spring to absorb movements of high frequency renders the shock absorber too yieldable and unable to check more violent and slow movements of the wheels or of the sprung parts of the vehicle.

Several arrangements have been used to vary the characteristics of shock absorbers to give the best action for different wheel movements irrespective of the frequencies and the amplitudes thereof. The most familiar is a manually operable control located within the reach of the operator of the vehicle by means of which the stiffness of the shock absorber can be regulated at will. By this means the shock absorbers can be stiffened upon rough roads or for high speed driving or softened for smooth roads and low speeds. This arrangement has the disadvantage that it requires the attention of the driver and cannot be adjusted fast enough to cope with changing characteristics of the road surface.

More elaborate automatic adjusting means have been provided on certain vehicles. One well known make is provided with a governor driven from the engine and connected to the shock absorbers to automatically change the adjustment with the speed of the vehicle. Another make is provided with means in each shock absorber to increase the stiffness of the shock absorber whenever it is brought into action a great deal. These two latter mechanisms, while possibly comparatively satisfactory, do not change the action of the shock absorber to deal with individual irregularities in the road surface but adjust them to meet the general conditions, and are complicated and correspondingly expensive.

One of the objects of the present invention is to provide novel means for resiliently mounting the wheels of automotive vehicles, which means are capable of absorbing the impacts to which the wheels of said vehicles may be subjected in operation, irrespective of the frequency or amplitude of such impacts.

Another object of the invention is to provide a novel shock absorber with a multiple yieldable response to the impacts to which it is operatively subjected, the means effecting such multiple yieldable response being capable of progressive and gradual engagement.

A still further object of the invention is to provide means of the above character which are automatic in operation, do not require any adjustments, are simple in construction and inexpensive to manufacture.

The above and other objects and advantages of the invention will appear from the following description and appended claims when considered in connection with the accompanying drawings forming a part of this specification.

In said drawings:

Fig. 1 is a fragmentary central longitudinal sectional view of the front end of a motor vehicle having a conventional front axle and semi-elliptic springs and showing one embodiment of the present invention.

Fig. 2 is a sectional view on the line 2—2 of Fig. 1, looking in the direction of the arrows.

Fig. 3 is a side view of Fig. 2 taken on the line 3—3 and looking in the direction of the arrows.

Fig. 4 is a fragmentary plan view of the modification of the invention as applied to the double wishbone type of independent suspension.

Fig. 5 is a view of the modification shown in Fig. 4 looking from the front of the vehicle.

Fig. 6 is a sectional view taken on the line 6—6 of Fig. 5, looking in the direction of the arrows.

Fig. 7 is a side view, partly broken away, of a modification of the invention as applied to an independent suspension of the double parallel longitudinal swinging arm type.

Fig. 8 is a sectional view taken on the line 8—8 of Fig. 7 looking in the direction of the arrows.

Fig. 9 is a perspective view of the shock absorber of the suspension shown in Fig. 7 seen from a point near the center of the vehicle and at the upper left hand corner of Fig. 7.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, shock absorber devices of the hydraulic type, embodying my invention, installed in motor vehicles with various types of wheel suspension. However, it is to be expressly understood that I do not desire to limit myself to shock absorbers of hydraulic type, or to the combinations of my novel shock absorber with the wheel suspensions of the types illustrated, since shock absorbers of other types, such, for instance, as those of friction or pneumatic type, may be constructed in accordance with the present invention, and such shock absorbers may be used in combination with wheel suspensions other than those of the types illustrated.

The structure shown in Figs. 1 to 3 inclusive, comprises a hydraulic shock absorber S installed at a front wheel W of an automotive vehicle having conventional wheel suspension with semi-elliptic springs. Said structure comprises a conventional frame having a side rail 10 extending longitudinally of the vehicle and having a semi-elliptic spring 11 secured below the side rail 10 by means of a spring bolt 12 and a spring shackle 13. The center of the spring 11 is secured to the axle 14 by U-shaped bolts 15, which spring also has a bracket 16 secured to it, said bracket carrying the pivot 17 for the lower end of a shock absorber link 18. The upper end of the shock absorber link 18 is joined by a pivot 19 to a crank arm 20 keyed to the shaft 21 of a double acting hydraulic shock absorber S.

The shock absorber shaft 21 is rotatably mounted on the side rail 10 of the frame by means of bearing 23 fastened to the side rail by bolts 24. The bearing 23 is provided with a rubber bushing 25 journalling the shaft 21. The absorbing unit 22 of the shock absorber S is mounted on the end of the shaft 21, which shaft projects out beyond the side rail 10. Instead of being directly bolted or otherwise rigidly secured to the frame, as is the case in conventional structures, the absorbing unit of my novel shock absorber is yieldably secured to the side rail 10 with the aid of means which permit a certain amount of rotation of said unit with respect to said frame 10 around the center line of the shaft 21. In the present embodiment said means are exemplified by lugs, such as 26, 26 held between two rubber blocks, such as 27, 27. Said rubber blocks 27, 27 are supported by suitable means rigidly secured to the frame, such as by brackets 28, 28, bolted or otherwise secured to the side rail 10. Any number of rubber supported lugs may be provided at one absorbing unit. I prefer to have two of such lugs, since it gives more satisfactory action, although one lug may be quite sufficient in some instances.

In operation, the shock absorber acts to control the action of vehicle springs by cushioning the compression and checking the rebound. Such shock absorbers are usually termed "double-acting shock absorbers". The resistance of the shock absorber S is not equal both ways, being less on compression of the springs. The resistance is developed by a fluid being forced by an oscillating piston (not shown) mounted on shaft 21, through check valves and controlled ports. Further description of the absorbing unit mechanisms is not necessary since said mechanisms may be of any well known types and hence the specific details thereof do not constitute a part of the present invention. Moreover, I do not desire to be limited to the use of such mechanisms. Thus, when the wheel W meets an obstruction operating to throw the wheel W and the axle 14 upward, the link 18 will tend to turn the wing or crank arm 20 in a counterclockwise direction. This movement of the arm 20 is opposed by the fluid resistance developed within the absorbing unit 22.

Selection of the degree of said resistance as well as of the rate of spring deflection constitutes finding a certain middle point between two extreme alternatives, which point is a suitable compromise for contemplated operation conditions. If the resistance of the shock absorber is too small and the springs are rather soft, the shock absorber, while successfully absorbing the small and fast oscillations of the axle without transmitting them to the frame, will not be able to offer sufficient resistance to more severe shocks or more violent oscillations of the axle to prevent their transmission to the frame and therefrom to the vehicle body. On the other hand, if the shock absorber is adapted to offer a sufficient resistance to more severe shocks, it is too "stiff" to yield to weaker or faster shocks, and the same are transmitted to the frame and to the vehicle body. This causes objectionable vibration of the vehicle body, squeaks and rattles in the joints thereof, as well as premature destruction of the shock absorber structure because of the subjection thereof to severe impact loads.

In my novel shock absorber the above difficulty is eliminated by the yieldable mounting of the absorbing unit 22, the resistance of said unit being so chosen as to be sufficient to resist severe shocks. Thus, vibrations of the axle 14, occurring due to the wheel W meeting small obstructions, are transmitted to the wing arm 20 and to the absorbing unit 22. However, since the absorbing unit 22 is yieldably mounted on the frame 10, said vibrations are not transmitted to said frame 10 but are absorbed by the elastic or resilient rubber blocks 27, 27. Since the resistance of the rubber blocks 27, 27, gradually increases in proportion to the deflection thereof, while the resistance of the absorbing unit is substantially constant for a given speed of oscillation, a severe shock is first received by the rubber blocks until a deflection thereof is reached which causes a resistance corresponding to the minimum resistance of the absorbing unit. Thereupon, the absorbing unit begins to yield to the oscillation, and the wing arm turns the shaft 21 with respect to the absorbing unit 22. The resistance of the rubber blocks 27, 27 is also increasing, since now the rubber blocks and the absorbing unit react in proportion to their respective resistances.

Thus, a gradual and progressive engagement of the shock absorber is effected, eliminating the difficulties described above.

The structure of Figs. 4 to 6, inclusive, shows a combination of my novel shock absorber with a front wheel suspension of the transverse articulated or "wish-bone" type. The braking and the steering mechanisms are omitted in said figures, in order to bring out the suspension features more clearly. Said structure comprises a transverse frame member 30, to which are hingedly connected two transverse, preferably drop-forged forked arms 31 and 32. The upper arm 31 may be termed a shock absorber arm, while the lower arm 32 may be termed a suspension arm. The lower arm 32 is longer than the upper arm 31 in order to maintain constant tread. The outer extremities of said arms are connected to the steering knuckle support member 35, such as at 33 and 34, respectively. The support member 35 carries a steering knuckle 36 which in turn carries the wheel W. The lower arm 32, which takes most of the brake torque reaction and end-thrust, is pivoted at its inner extremities 32a, 32a, to the frame member 30, such as at 37. A vertical coil spring 38 is mounted between the frame member 30 and the suspension arm 32, and is, therefore, compressed when the weight of the vehicle is transmitted through it from the frame member 30 to the suspension arm 32 and finally to the wheel W.

The inner extremities 31a, 31a, of the shock absorber arm 31 are keyed or otherwise secured to the shock absorber shaft 40, such as at 41, 41. The shaft 40 carries an absorbing unit 42 which is of the hydraulic, double-acting type. The shaft 40 is journalled in bearings provided in brackets 43 and 44, which bearings have rubber bushings, such as 45 and 46, respectively. The housing of said absorbing unit 42 is provided with a lug 47 which is embedded in a rubber block secured to the frame, or is held between two rubber blocks, such as 48, 48 supported on a frame member by a bracket 49.

It will be appreciated in view of the foregoing that a very soft spring may be used in this structure in combination with a stiffer double-acting shock absorber. The small irregularities of the road which cause rapid up-and-down movements of the wheel W are permitted to deflect the soft spring 38. This feature is very objectionable with conventional constructions since, first, it necessitates the use of a softer spring which may be too soft for more rough roads, and second, because it requires either "softening" the shock absorber, permitting it to absorb such small and rapid vibrations (thus making it unable to respond properly to more violent movements of the wheel and the vehicle sprung weight), or using a stiffer shock absorber and permitting transmission of such vibrations through such stiff shock absorber to the vehicle body, causing premature wear and an extremely uncomfortable riding characteristic.

With my novel shock absorber such difficulties are entirely eliminated. I can advantageously use a rather soft suspension spring absorbing the rapid vibrations of the wheel structure. The stiffness of the absorbing unit 42 causes it to move with the shaft 40 following said vibrations. However, since the vibrations are absorbed by the rubber block 48 and 49 they are not transmitted to the vehicle body, and yet the shock absorber is stiff enough to check the most violent impacts to which it may be subjected.

The structure illustrated in Figs. 7 to 9, inclusive, is a combination of my novel shock absorber with a wheel suspension described and claimed in my co-pending application, Serial No. 72,722, filed April 4, 1936. In this particular type of suspension the usual spring mechanism is eliminated and the resiliency of suspension is effected by a rubber mass subjected to torsional stresses, said rubber mass being reenforced by a metal rod also subjected to torsion when the wheel is moving upward. The rubber mass under tension is represented in such suspension by rubber bushings 50, 50 fitted into the ends of a transverse tubular member 51 rigidly secured to a vehicle body member and bonded to the inner surface of said tubular member 51. The inner surfaces of said rubber bushings 50, 50 are bonded to a member carrying a stub shaft, such as 52, to which is secured a suspension or load arm 53 pivotally secured to the lower portion of the steering knuckle support 54 which in turn carries the wheel W. At the upper portion of said support 54 there is pivotally secured a shock absorber arm 55, the opposite extremity whereof is keyed or otherwise secured to the shock absorber shaft 60 rotatably mounted in bearing 61 provided in a supporting member 63 rigidly secured to the vehicle body structure. Said bearing 61 is provided with a suitable two-part rubber bushing such as 62. On said shaft 60 there is mounted an absorbing unit 64 which is of the hydraulic, double-acting type. The housing of said absorbing unit 64 is provided with a lug 65 which is held between two rubber blocks 66, 66 secured in a suitable bracket rigidly connected to the vehicle body structure, such as a bracket 67.

In operation, the weight of the vehicle is supported by the suspension arms 53 which transmit said weight to the wheels W at opposite sides of the vehicle. The upward movement of the arm 53 causes rotation of the stub shaft 52 which puts the rubber bushings 50, 50 in torsion and resists rotation of said shaft 52, thus effecting the resiliency of the wheel suspension.

It will be appreciated in view of the above description that rapid vertical movements of small amplitude of each wheel W are permitted to be absorbed by the bushings 50, 50, which are adapted to yield to such movements. The movements of the arm 53 are transmitted through the support member 54 to the shock absorber arm 55 and to the shaft 60. The shock absorber is made "stiff" enough to check the most violent movements of the wheel W to which the same may be subjected when the vehicle is travelling over very poor roads. Therefore, the rotative vibrations of the shaft 60 cause similar vibrations of the absorbing unit 64 which, as mentioned, is too stiff to yield to such rapid, short movements. In conventional shock absorbers such vibrations of the absorbing unit are transmitted to the vehicle body structure, imposing considerable stresses upon the shock absorber mechanisms, causing vibrations in the body, resulting in unpleasant riding characteristics and objectionable noises. In my novel shock absorber, because of the operation of the above described means, such vibrations are substantially completely absorbed by the rubber blocks 66, 66. When the deflection of the rubber blocks 66, 66 reaches an amount causing a resistance of said blocks approximately equal to the resistance of the absorbing unit itself, said unit is gradually engaged in operation, thus effecting a progressive and continuous engagement of the shock absorber, and giving a smooth reaction curve when the operation of such absorber is represented graphically according to the methods well known in the art.

Thus, in one of its broader aspects my invention contemplates providing a novel shock absorber of double acting type, having means whereby the high frequency vibrating movements of the absorbing unit caused by the inability of said unit to yield to them, are absorbed by said means without being transmitted to the vehicle body. In another of its broader aspects my invention contemplates providing a shock absorber floatingly secured to the vehicle structure, whereby a certain amount of operative response of the shock absorber is permitted, without relative movement of the shock absorber shaft and the absorbing unit. In still another of its broader aspects my invention contemplates providing a novel shock absorber having two stages of resilient operative response: the first stage intended to absorb high frequency movements of short amplitude and effected by resilient mounting means of the shock absorber on the body of the vehicle, and the second stage intended to absorb more violent movements and effected by operative response of the shock absorber mechanisms.

Although only three embodiments of my invention have been illustrated and described, the same is capable of being modified still further without departing from the scope of my invention. For instance, more than two resilient stages may be provided in the shock absorber; rubber blocks may be substituted by springs or by pneumatic or hydraulic dampening mechanism, and so on.

I claim:

1. In a vehicle, a member rigidly connected to the body thereof; a wheel resiliently mounted and movable substantially vertically with respect to said member; a shock absorber having an absorbing unit yieldably affixed to said member and an operating shaft positively and operatively connected to said wheel and resiliently journalled in said member.

2. In a vehicle, a frame member; a wheel movable substantially vertically with respect to said frame; a hydraulic shock absorber having an absorbing unit yieldably affixed to said frame and an operating shaft operatively and positively connected to said wheel and resiliently journalled in said member.

3. In a vehicle, a frame member; a wheel resiliently mounted and movable substantially vertically with respect to said frame member; a double acting shock absorber having a shaft resiliently journalled in said frame member and an arm affixed to said shaft and operatively connected to said wheel and moving therewith, and an absorbing unit mounted on said shaft and resiliently secured to said frame.

4. In a vehicle, a member rigidly connected to the body thereof; a resiliently mounted wheel movable substantially vertically with respect to said member; a hydraulic shock absorber adapted to cushion the compression and check the rebound of the resilient mounting means of said wheel; said shock absorber having an absorbing unit floatingly anchored to said member and an operating shaft carrying said absorbing unit and resiliently journalled in said member, whereby a predetermined amount of movement of said absorbing unit with respect to said member is permitted independently of the operative hydraulic response of said unit.

5. In a vehicle, a frame member; a wheel resiliently mounted and vertically movable with respect to said member; a shaft rotatably mounted on said frame member and operatively connected to said wheel so as to turn in response to the vertical movements of the wheel; a hydraulic shock absorbing unit mounted on said shaft and adapted to cushion the compression and to check the rebound of the resilient mounting means of said wheel; and means for floatingly mounting said unit on said frame member to permit a predetermined amount of movement of said unit with respect to said frame.

6. In a vehicle having an axle, a frame member and a spring interposed therebetween; a wheel carried by the axle; a link pivotally connected to said spring; a shaft rotatably mounted on the frame member and provided with an arm rigidly secured thereto at one end, the opposite end of said arm being pivotally connected to said link; a double acting hydraulic shock absorbing unit mounted on said shaft; and means resiliently restraining the rotation of said unit with respect to the frame member.

7. In a vehicle, a frame member; a wheel resiliently mounted and vertically movable with respect to said member; a shaft rotatably mounted on said frame member and operatively connected to said wheel so as to turn in response to the vertical movements of the wheel; a hydraulic shock absorbing unit mounted on said shaft and adapted to cushion the compression and to check the rebound of the resilient mounting means of said wheel; and means for floatingly mounting said unit on said frame member to permit a predetermined amount of movement of said unit with respect to said frame, said last named means comprising a mass of rubber supported on said frame member.

8. In a vehicle, a frame member; a wheel resiliently mounted and vertically movable with respect to said member; a shaft rotatably mounted on said frame member and operatively connected to said wheel so as to turn in response to the vertical movements of the wheel; a hydraulic shock absorbing unit mounted on said shaft and adapted to cushion the compression and to check the rebound of the resilient mounting means of said wheel; and means for floatingly mounting said unit on said frame member to permit a predetermined amount of movement of said unit with respect to said frame, said last named means comprising a lug on said unit engaging a rubber member fixed to said frame member.

9. In a vehicle, a transverse frame member; a suspension arm resiliently and rotatably mounted at one of its ends in said member and having a steering knuckle support member secured at its other extremity; a shock absorber arm pivotally connected at one of its ends to said support member and having a shaft secured to its other end, said shaft being rotatably mounted on said frame member; a shock absorbing unit mounted on said shaft and adapted to cushion the compression and check the rebound of the suspension arm mounting means; and means for resiliently restraining rotation of said unit with respect to said frame member.

10. In a vehicle, a transverse frame member; a suspension arm resiliently and rotatably mounted at one of its ends in said member and having a steering knuckle support member secured at its other extremity; a shock absorber arm pivotally connected at one of its ends to said support member and having a shaft secured to its other end, said shaft being rotatably mounted on said frame member; a shock absorbing unit mounted on said shaft and adapted to cushion the compression and check the rebound of the suspension arm mounting means; and means for resiliently restraining rotation of said unit with respect to said frame member, said means comprising a mass of rubber supported on said frame member.

11. In a vehicle, a transverse frame member; a suspension arm resiliently and rotatably mounted at one of its ends in said member and having a steering knuckle support member secured at its other extremity; a shock absorber arm pivotally connected at one of its ends to said support member and having a shaft secured to its other end, said shaft being rotatably mounted on said frame member; a shock absorbing unit mounted on said shaft and adapted to cushion the compression and check the rebound of the suspension arm mounting means; and means for resiliently restraining rotation of said unit with respect to said frame member, said means comprising a lug on the housing of said unit engaging a rubber member rigidly supported on said frame member.

12. A multiple response shock absorber for a vehicle having a sprung portion and an unsprung portion, said shock absorber comprising a body, a shaft rotatably arranged within said body and protruding therefrom, an absorbing mechanism adapted to absorb low frequency shocks mounted on said shaft and arranged within said body, a resilient support secured to the vehicle sprung portion for journalling the protruding portion of said shaft and resisting resiliently the transverse loads imposed thereon, a radial extension on said body, and resilient means carried by the sprung portion, said means arranged to resist resiliently the vibratory movements of said extension caused by the high frequency rotative movements of said shaft transmitted to said body by the absorbing mechanism.

13. A double response shock absorber for a vehicle having a sprung portion and an unsprung portion, said shock absorber comprising a body, a shaft rotatably arranged within said body and protruding therefrom, an absorbing mechanism mounted on said shaft and arranged within said body, a lug on said body, resilient means having lower operative resistance than said absorbing mechanism, said resilient means being mounted on said sprung portion and arranged to resist resiliently and to absorb thereby the vibratory movements of said lug caused by the high frequency rotative movements of said shaft transmitted to said body by the absorbing mechanism.

14. In combination with a vehicle having a resiliently mounted portion including resilient mounting means, a shock absorber adapted to cushion the compression and check the rebound of said resilient mounting means, said shock absorber having a rotatable shaft resiliently journalled in said portion, whereby a certain amount of bodily movement of said shaft with respect to said resiliently mounted portion is permitted.

15. A double response shock absorber for a vehicle having a sprung portion and an unsprung portion, said shock absorber comprising a body, a shaft rotatably arranged within said body and having an end protruding therefrom, an absorbing mechanism adapted to absorb low frequency shocks mounted on said shaft and arranged within said body, a rubber bushing secured in the sprung portion of the vehicle for journalling the protruding end of said shaft and resiliently resisting the transverse loads imposed thereon, a lug on said body, rubber blocks secured to said sprung portion and holding said lug so as to resist resiliently the vibratory movements thereof caused by the high frequency rotative movements of said shaft transmitted to the shock absorber body by the absorbing mechanism.

JOHN TJAARDA.